United States Patent Office 3,399,062
Patented Aug. 27, 1968

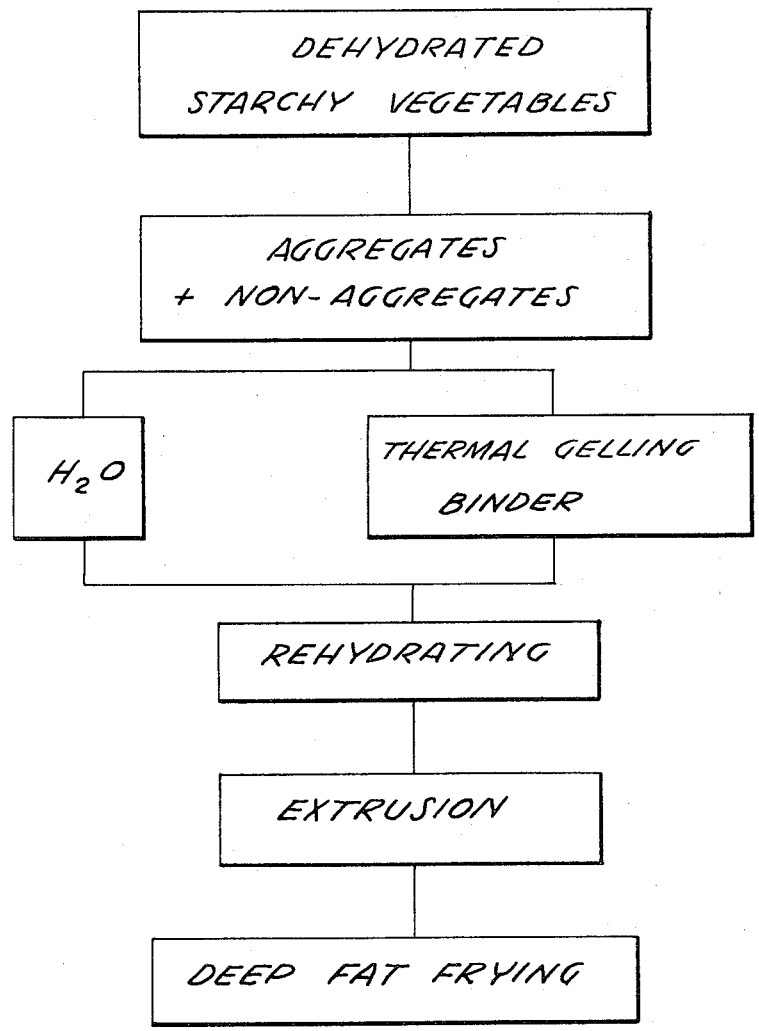

3,399,062
PRODUCING FRENCH FRIED VEGETABLES FROM STARCH - CONTAINING DEHYDRATED VEGETABLES AND A CELLULOSE ETHER BINDER
Miles J. Willard, Jr., and Gerald P. Roberts, Idaho Falls, Idaho, assignors to Rogers Brothers Company, Bonneville, Idaho, a corporation of Delaware
Continuation-in-part of applications Ser. No. 348,321, and Ser. No. 348,324, Feb. 26, 1964. This application Jan. 8, 1965, Ser. No. 424,338
14 Claims. (Cl. 99—100)

This application is a continuation-in-part of U.S. application Ser. No. 348,321, filed Feb. 26, 1964, now abandoned and Ser. No. 348,324, filed Feb. 26, 1964, now abandoned, by Miles J. Willard, Jr., and Gerald P. Roberts, which applications are in turn continuations of U.S. Ser. No. 19,800, filed Apr. 4, 1960, now abandoned, and U.S. Ser. No. 81,119, filed Jan. 6, 1961, now abandoned.

This invention relates broadly to the process for preparing preformed food products from starchy vegetables. More particularly, the present invention relates to a process for producing heat processed food products formed from a mixture of dehydrated, comminuted, starchy vegetables and a thermal gelling cellulose ether edible binder, and to the method whereby such products are formed.

At the present time the known processes for producing fried potato products from fresh potatoes involve peeling and trimming raw potatoes, washing and then slicing or cutting to obtain desired shapes. The potato pieces are blanched and immediately deep fried or kept in cold storage, i.e., under refrigeration at a temperature of about 35° to 45° F., until used. When immediately fried, the resulting product is then usually frozen and distributed as a household food which can be prepared by oven heating. In addition, the fresh cut pieces may be partially fried, frozen, and subsequently refried at the time they are prepared for consumption. If the product is to be used by hotels, restaurants, or cafeterias, it is often packaged and stored.

The processes available to the art at the present time for producing French fried products require a more or less uniform, raw vegetable material, if waste following the cutting of the vegetable into the desired shapes is to be maintained at a minimum.

Further difficulties arise in the processing of French fried products from vegetables, due to the physical and chemical characteristics inherent in the vegetables. Among these are the size, shape, sugar content, solid content, and specific gravity. The problems caused by variations of such properties in potatoes are discussed in detail in "Potato Processing," published in 1959 by the A.V.I. Publishing Company, Inc., West Port, Conn., and edited by two members of the United States Department of Agriculture, W. F. Talbert and O. Smith.

It has been found that the waste attributable to variations in size of the vegetable is substantial, since only the pieces of the vegetable which are large enough for the finished product are considered useful. Pieces which are smaller than acceptable size could not be French fried with the larger pieces without resulting in a burned product. Accordingly, such smaller pieces in the form of slivers and the like are discarded or converted into less desirable food products. Also, it has been the practice to seek only firm, fresh vegetables when mixtures have been prepared from reconstituted vegetable solids, such as mashed, dehydrated, flaked, powdered, or otherwise processed vegetables.

In the prior art as known, there have been attempts to use methyl cellulose ethers as a binder with food products. Such disclosures are embodied in, for example, the Rivoche U.S. Patents Nos. 2,786,763, 2,791,508, 2,798,-814, and 2,887,382. In the first two patents heat irreversible gels are produced by the action of a gelling agent in the form of an alkaline earth metal. In the latter two of these prior art teachings, a solution of the binder is used to permit steaming or freezing of the otherwise substantially raw food. This substantially high water content, necessary according to the patent, presents a problem if the limited patented procedure is varied. For instance, if the food product is uniformly cooked, by deep fat frying or baking, the exterior of the patty product of the patented process will gel quickly to form a relatively firm, impervious barrier to the steam developing within the product. When the steam is finally sufficiently pressurized, it will explode the product. To avoid this occurrence, the patented process must be limited to nonuniform heating, such as pan frying, in order that the developed steam may pass through the side of the patty not in contact with the heated surface, and therefore not fully gelled.

The present invention obviates the difficulties attributable to nonuniformity heretofore experienced and produces French fried vegetable products from starchy vegetables through the use of such vegetables in dehydrated form along with suitable cellulose ether binders.

Accordingly, it is the principal object of the present invention to provide a method for producing French fried food products from starchy dehydrated vegetables.

Another object of the present invention is to provide a method for producing French fried food products from starchy, dehydrated vegetables by rehydrating the dehydrated vegetables in the presence of a cellulose ether binder, without the necessity of using high temperatures of rehydration.

Another object of the present invention is the low temperature rehydration of aggregates of dehydrated, starchy vegetables, including granules and crushed dice, in the presence of a cellulose ether binder, permitting extrusion of the product so formed.

A further object of the present invention is the provision of a process for rehydration of dehydrated, starchy vegetables at low temperatures in the presence of a cellulose ether binder and extruding the vegetables for subsequent French frying.

This invention has the additional objective of providing a mixture of aggregates of starchy vegetables and nonaggregates with a cellulose ether binder to produce uniform shaped pieces after French frying.

Yet another object of this invention is the provision of a raw pulp addition to a mash obtained from dehydrated vegetables, and a thermal gelling binder to produce a French fried product.

Another and more particular object of the present invention is the provision of aggregates of starch-containing vegetables, such as granules or crushed dice, with the optional addition of flakes of a starch-containing vegetable, and rehydrating the mixture at low temperatures in the presence of a thermal gelling binder, and the subsequent extrusion of the mixture without the necessity of cooling.

Other objects and advantages of the present invention will become apparent to those skilled in the art from the following description when read in conjunction with the accompanying drawing, wherein there is shown in schematic form the operational steps in accordance with the present invention.

In general the process of the present invention comprises providing dehydrated, starch-containing vegetables that may be composed of aggregates, such as crushed dice or granules, and the optional addition of flakes, and the further optional addition of raw vegetable pulp, adding water at a temperature between 45° and 130° F. for rehydration of the dehydrated vegetables, adding a thermal gelling cellulose ether binder to form a mixture, the binder being either dry and added before the water, or in aqueous solution, and providing at least part of the water or rehydration, mixing the mixture to rehydrate substantially all of the dehydrated vegetable, extruding the mixture between 45° and 130° F. without the necessity of artificially cooling the mixture, and deep fat frying the mixture to form an edible vegetable product.

The vegetables that have been found useful, according to the present invention, are those normally considered starchy, such as potatoes, corn, barley, and rice; however, any other vegetables containing starch would also be suitable for this use, according to the present invention.

This invention is principally limited to the use of dehydrated, starchy vegetables, although small quantities of spices or other flavorings may be added. The dehydrated starchy vegetables, in accordance with the present invention, must be in the form of aggregates or clumps of intact cells which are essentially multicellular in all directions, or individual intact vegetable cells, and must contain at least a major portion of their vegetable form as part of an intact cell. Such aggregates may take any well known form, such as that of granules, described in the U.S. Department of Agriculture Circular A.I.C. 297, entitled "Dehydrated Mashed Potatoes—A Review," or crushed dehydrated diced vegetables, such as may be manufactured from dehydrated vegetables, for example, by passing a conventionally diced, blanched, dehydrated vegetable through a hammermill fitted with $\frac{1}{16}''$ diameter screen opening. The crushed dehydrated potato provides a firm, nonmushy French fried product of granular consistency, without undesirable crunchiness. Any other form of a multicellular starchy vegetable particle would be similarly usable, in accordance with the present invention, as long as the particle contains a majority of its cells intact and unbroken.

Also, it has been found that the monocellular thick flake form of the dehydrated vegetable may be used. However, a composition containing all flakes would produce—upon French frying of the extruded product—a hard exterior crust, and also would produce feathering, which is evidenced in the final product by deep repeating indentations in the exterior surface. The feathering in the fried product occurs when flakes are used alone and is produced because of the thin, often-times monocellular thickness of the flake. This monocellular thickness of the flake is desirable, particularly with respect to potatoes, since it produces a mealy texture similar to that of fresh, cooked potatoes; however, the thin cellular structure of the flake has been found to assist the collapse of the skin of the extruded product, due to the oil or fat constituting the deep frying medium penetrating the potato product between the cells, thereby causing extreme dehydration. This penetration of oil or fat also produces stresses in the skin, resulting in the shrinking of the skin and complete failure of the skin to withstand the stresses, as is clearly evidenced by the repeating collapsed areas along the outer portion of the dried product. It has been found to be characteristic of a product which contains solely flakes that the skin is very thin and hard, and may extend substantially to the center of the extruded French fried product, resulting in a completely unpalatable food.

Accordingly, it has been found, when flakes are used to simulate the texture of the natural vegetable, that aggregates, which are multicellular (in three directions) particles of the vegetable, such as granules, or crushed dehydrated dice, and the like, in an amount between 5% and up to approximately 100% of the total weight of the vegetable must also be used. It is also possible to use finely ground dehydrated vegetables, such as a flour or starch, in place of the flakes; however, the texture of the final product will not be quite as desirable as when flakes are used. In any event, at least 5% to 100% of the total weight must be in the form of aggregates, regardless of the other ingredients.

In order to use dehydrated vegetables in the form of aggregates, one practice has been traditionally followed—that is, the rehydration must take place at a temperature greater than 160° F. See Advances in Food Research, volume 6, 1955, page 248. Such high temperature water was thought to be necessary in order to first wet the aggregates and then rehydrate them to a soft, normally acceptable form. Particularly if the product is to be extruded, the rehydration must be substantially complete, and heretofore water at a temperature of less than 160° F. would not alone rehydrate dehydrated vegetable aggregates. Also, it should be noted that if a rehydration temperature greater than 160° F. is used, as is conventional in the art, the product—even if containing a suitable thermal gelling binder—would not produce a satisfactory French fried product after extrusion, unless cooling below 110° F. was accomplished.

In accordance with the present invention, it has been found that the dehydrated vegetable product containing at least some aggregates of individual cells can be substantially completely rehydrated at low temperature in the presence of a cellulose ether thermal gelling binder. It must be noted also that the thermal gelling binder can be solvated with the vegetable when water is added—either in the form of a thermal gelling binder solution, or separately, and the dispersion of the binder within the vegetable mix will take place during or even after rehydration of the vegetable. The water in either case will substantially simultaneously solvate the binder mixed with the vegetable and rehydrate the dehydrated vegetable—all at a temperature not above 130° F., but above approximately 45° F., though preferably between 45° and 90° F. Of course, it should be understood that the temperature of hydration may vary from the temperature of the water, due to the temperature of the solid dehydrated vegetable.

The amount of water that should be present in the mixture of binder and vegetable should range approximately between .9 to 4.5 parts by weight per part vegetable solid. On either side of this range the product would be too dry or wet to be acceptable as a commercial product.

The preferred binders are polymeric ethers of cellulose that are thermally gellable, and have the basic formula:

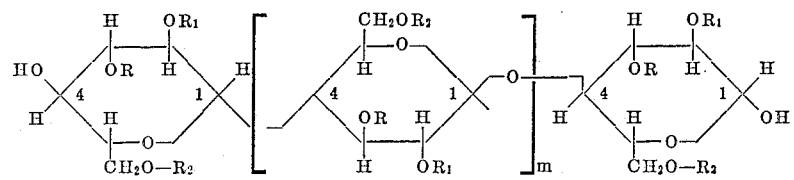

wherein R, $R_1$ and $R_2$ are selected from the group consisting of hydrogen, alkyl (such as ethyl, methyl, propyl isopropyl, and the like), and hydroxy alkyl (such as hydroxyethyl hydroxymethyl, hydroxypropyl, and hydroxyisopropyl); and wherein at least one R, $R_1$ and $R_2$ is selected from the group consisting of ethyl and methyl.

Within the group of compounds represented by the above formula are those having the unique property of gelling with the application of heat, and thus may be termed thermal gelling cellulose ethers. These compounds all absorb water upon cooling to solvate, and form a gel upon heating, accompanied by a loss of water. Only the cellulose ethers that are thermally gellable form a part of this invention. However, it is to be noted that any edible thermal gelling compound, even if not within the above formula may be used in the practice of this invention. An important feature of these thermal gelling compounds is that the gelation property is reversible from either the solvated or gel state by controlling the temperature of the gel.

Included within this term, thermal gelling cellulose ethers, are:

(a) Alkylcellulose ethers, such as methyl and ethyl cellulose ethers and the methylcellulose ethers produced as Methocel MC type.

(b) Alkyl hydroxyalkylcellulose ethers, such as hydroxyethyl methylcellulose produced as Tylose TWA/MK–3000, in Germany, ethyl hydroxyethylcellulose produced as Modocoll–600, in Sweden, and the hydroxypropyl methylcellulose, such as "Methocel 60 H.G." and "Methocel 90 H.G.," produced in the United States.

These thermal gelling binders may be used as a dry powder or in liquid form, particularly as an aqueous solution. It is possible to used aqueous solutions up to 18% concentration of the thermal gelling binder, such as methyl cellulose ether. The concentrations are actually to be limited only by the solubility of the binders in water. Generally, however, concentrations between 1% and 3% have been found to be workable. The binders can be used in amounts preferably from 1 part per 100 parts of food solids, to about 30 parts per 100 parts by weight of food solids. When the thermal gelling binder is omitted, the product tends to fall apart when deep fat fried, due to the failure of the inherently weak structure of the vegetable solids to hold a predetermined shape. As the amount of binder used increases, the product becomes increasingly compact and firm, and maintains this firmness during the heat processing.

The binder also may be used dry, in which event it has been believed necessary to wet the binder prior to its entering a solution phase by using nearly boiling water, and usually within the range of 176° to 194° F. Accordingly, with the necessity to wet the binder by the use of hot water and the universal practice of using very hot water to rehydrate dehydrated vegetables having aggregate cells, it is completely unexpected that relatively cool water that is not greater than 130° F. and most often not greater than 110° F., and preferably no greater than 90° F., but above 45° F., can be used to substantially completely rehydrate the dehydrated vegetable aggregate cells, and at the same time wet the dry thermal gelling binder. Of course, if the binder is initially added as an aqueous solution, the water in such binder solution has obviously already wetted the binder, and thus such water performs only the function of rehydrating the vegetables. In either case, however, an extrudable and French fryable product is produced without the necessity of further cooling.

It is theorized—but applicants do not wish to be held to this theory—that the water at low temperature (no greater than 130° F.), when in the presence of the binder (whether dry or added with the water or rehydration as a binder solution) is nevertheless able to wet the aggregates to rehydrate these multicellular vegetable particles at the low temperature below 130° F. and does not require the high temperature water of rehydration, which is usually about 160° F. Applicants believe there is a synergistic effect between the water and the thermal gelling binder which enables the water to rehydrate the vegetable aggregates. Without the presence of the binder, rehydration is not accomplished at temperatures of 130° F., or below even if permitted to stand for an extended period of time.

The extrusion of the mixture of the thermal gelling binder and the rehydrated vegetable mash may be accomplished by any conventional extruder with openings as small as 1/32" diameter for thin chip-size products, or can be 1" or more for larger snack items. The shape of the extrusion opening is immaterial and may vary considerably.

After extrusion, the product is gelled by deep fat frying only. The frying can be either complete or partial, according to the ultimate use anticipated.

For example, in the stance of French fried potatoes, the extruded pieces can be fried in an edible oil, such as peanut or soybean oil, at a temperature of about 350° F. for a period of approximately 2 to 4 minutes, to yield a French fried product which can be immediately consumed, or can be packaged or stored in an appropriate manner. In the instance of extruding in a French fry shape, the product can be quick frozen after the heat processing, and subsequently prepared for consumption by heating in a hot sack, or by baking in an oven. In the instance of forming a crisp snack item, the frying can be continued until the product is dry enough to be packed and stored in a standard manner at room temperature. Alternatively, the frying period can be reduced to one or two minutes, if it is desirable to store or package the product in a semifinished state, so that it can be subsequently fried or similarly heated at the time it is to be used. In this semifinished state, the exterior of the product has gelled to a firm retaining shape.

*Flake mixes*

In general it has been found that when flakes are used, aggregates of the vegetables, such as dehydrated granules or crushed dice, must also be used to prevent the feathering which would inherently occur, due to the deep fat frying. The amounts of the aggregates that should be present are desirably 5% to 60% of the total vegetable product; however, up to 100% aggregates can be used. When the dry cellulose ether binder, such as Methocel, is used, it was found that rehydration temperatures as low as 45° F. were possible, and that extended mixing of up to 3 minutes, while not being critical or essential, was found to enhance the hydration, particularly if it other wise extended beyond the usual mixing time of 30 seconds.

For example, when the rehydration of the flakes in the presence of a dry binder was attempted, with water at a temperature of 45° F., it was found that mixing, for instance, for approximately one minute at 196 r.p.m. facilitated the rehydration of the flakes.

At high temperature rehydration—that is, temperatures above 80° F., but not above 110° F.—it was found that the mixtures seem to become drier as the rehydration temperature increased, and thus it was found preferable to have a water to vegetable solids ratio between 2.5 to 1 and 3.5 to 1 at rehydration temperatures above 80° F. Lower water to solids ratios may be used; however, such lower ratios are preferably present at lower rehydration temperatures—that is, below 80° F. The preferable limits of the water to vegetable solids ratio in the presence of the dry thermal gelling binder extend from 1 to 1 to 3.5 to 1; however, the broader ratios between .9 and 4.5 to 1 can be utilized, although they produce a less satisfactory product. The following examples are illustrative, wherein granules or other aggregates may be substituted for the crushed dice (C.D.) and other starchy vegetables than potatoes yield similar results.

Example 1

The following dry ingredients were combined:

80 grams potato flakes, crushed through a U.S. Std 20 mesh opening,
20 grams dehydrated dice potatoes, crushed through a U.S. Std 20 mesh opening,
4 grams salt,
4 grams Methocel 65 HG.

To this mixture, 200 cc. of water at 60° F. were added and mixed thoroughly for one minute at a low speed. The resulting dough-like material was allowed to stand for several minutes to insure complete rehydration at an average temperature of 65° F. of the crushed dehydrated particles, and then extruded at a temperature of approximately 70° F., using a household type cookie press fitted with a ⅜" square opening directly into an oil bath containing stabilized cottonseed oil held at 350° F.

After 4 minutes the French fries were a pleasing, uniform, golden brown color, and possessed a firm, well cooked, natural appearing interior.

Part of the product was frozen and stored at 0° F. When prepared by heating in an oven at 400° F. for about 15 minutes, it was judged superior in quality to typical commercial products obtained from raw potatoes and heated in the same manner.

Other examples following the same procedure as in Example 1 are as follows:

| Example No. | Composition | Wgt. H₂O/ Solids | Amt. Binder (90 HG) gm./100 gm. | Mix Time | H₂O Add Temp. | Ave. Rehyd. Temp. | Extr. Temp. |
|---|---|---|---|---|---|---|---|
| 2 | 73% Flakes, 27% C.D. | 0.9:1 | 3.65 | 30 sec | 45 | 50 | 55 |
| 3 | do | 1.82:1 | 3.65 | 30 sec | 43 | 49 | 55 |
| 4 | 80% Flakes, 20% C.D. | 3.5:1 | 4 | 1 min | 90 | 90 | 90 |
| 5 | do | 3.5:1 | 4 | 1 min | 100 | 95 | 90 |
| 6 | do | 2.5:1 | 4 | 1 min | 90 | 89.5 | 89 |
| 7 | do | 2.5:1 | 4 | 1 min | 100 | 96 | 92 |
| 8 | do | 3.5:1 | 4 | 1 min | 110 | 104 | 98 |
| 9 | do | 3:1 | 3 | 30 sec | 80 | 80 | 80 |
| 10 | do | 2:1 | 4 | 30 sec | 80 | 80 | 80 |

When a solution of the binder is utilized, which is usually in the range from 1% to 3%, and preferably about 2%, it is found that the rehydration at 45° F. is somewhat slow, but nevertheless successful. Further, the water to solids ratio is preferably in the range between 1 and 4.5 to 1. It was also found that mixing for approximately one to two minutes produced the most satisfactory results, with the longer mixing time being desirable with the higher water to solids ratio.

The following examples, similar to Example 1, except as indicated, are illustrative:

| Example No. | Composition | Wgt. H₂O/ Solids | Amt. Binder (90 HG) gm./100 gm. | Mix Time | H₂O Add Temp. | Ave. Rehyd. Temp. | Extr. Temp. |
|---|---|---|---|---|---|---|---|
| 11 | 80% Flakes, 20% C.D. | 4:1 | 6 | 1 min | 80 | 80 | 80 |
| 12 | do | 3:1 | 4.5 | 1 min | 60 | 62 | 64 |
| 13 | do | 1:1 | 2 | 1 min | 80 | 80 | 80 |
| 14 | do | 2:1 | 2 | 1 min | 80 | 80 | 80 |
| 15 | do | 2:1 | 4 | 30 sec | 45 | 52 | 60 |
| 16 | do | 3:1 | 4.5 | 1 min | 36 | 40 | 44 |
| 17 | do | 4.5:1 | 6.75 | 1 min | 80 | 80 | 80 |
| 18 | do | 2:1 | 4 | 30 sec | 60 | 65 | 70 |
| 19 | do | 1.5:1 | 3 | 30 sec | 60 | 65 | 70 |
| 20 | do | 2.5:1 | 5 | 30 sec | 90 | 85 | 80 |
| 21 | do | 3.5:1 | 5.25 | 30 sec | 80 | 80 | 80 |
| 22 | do | 3.5:1 | 5.25 | 1 min | 90 | 87 | 84 |
| 23 | do | 3.5:1 | 5.25 | 1 min | 102 | 99 | 92 |
| 24 | do | 3.5:1 | 5.25 | 1 min | 110 | 100 | 90 |
| 25 | do | 4:1 | 6 | 1 min | 90 | 90 | 90 |

*Aggregates*

When a dry binder is mixed with aggregates which may be in the form of dehydrated granules or mixtures of granules and crushed dice, it is found that the preferable temperatures of rehydration are between approximately 45° and 90° F., and more preferable between 60° and 70° F., with the water to solids ratio preferably between 1.5 to 3 to 1. The following examples, in accordance with the steps of Example 1, are illustrative:

| Example No. | Composition | Wgt. H₂O/ Solids | Amt. Binder (90 HG) gm./100 gm. | Mix Time, (min.) | H₂O Add Temp. | Ave. Rehyd. Temp. | Extr. Temp. |
|---|---|---|---|---|---|---|---|
| 26 | Granules | 2:1 | 4 | 2 | 90 | 86½ | 83 |
| 27 | do | 2.5:1 | 4 | 2 | 60 | 66 | 72 |
| 28 | do | 2:1 | 4 | 2 | 52 | | |
| 29 | do | 1.5:1 | 4 | 2 | 60 | 66 | 72 |
| 30 | do | 1.5:1 | 4 | 2 | 80 | 80 | 80 |
| 31 | do | 2:1 | 4 | 2 | 90 | 90 | 90 |
| 32 | do | 2.5:1 | 4 | 2 | 90 | 89 | 88 |
| 33 | do | 2.5:1 | 4 | 2 | 100 | 95 | 90 |
| 34 | do | 1.5:1 | 4 | 2 | 45 | 54 | 63 |
| 35 | do | 2.5:1 | 4 | 2 | 45 | 54 | 63 |
| 36 | do | 3:1 | 4 | 2 | 80 | 79 | 78 |
| 37 | do | 2.5:1 | 4 | 2 | 80 | 79 | 78 |
| 38 | 77% granules, 19.2% C.D. | 2:1 | 3.75 | 2 | 80 | 79 | 78 |
| 39 | Granules | 2.5:1 | 4 | 2 | 45 | 46½ | 48 |

When the aggregates in the form of granules are used with the solution binder, it was found that the temperature rehydration may vary between 45° and 110° F., with the water to solids ratio preferably between 2 and 3.5 to 1.

The following examples, in accordance with the steps of Example 1, are illustrative:

initial frying. Part of the product was frozen. After thawing at room temperature the product remained firm.

| Example No. | Composition | Wgt. H₂O/ Solids | Amt. Binder (90 HG) gm./100 gm. | Mix Time (min.) | H₂O Add Temp. | Ave. Rehyd. Temp. | Extr. Temp. |
|---|---|---|---|---|---|---|---|
| 40 | Granules | 2:1 | 4 | 1 | 80 | 80 | 80 |
| 41 | do | 2:1 | 4 | 2 | 94 | | |
| 42 | do | 1:1 | 2 | 2 | 60 | 62 | 65 |
| 43 | do | 2:1 | 4 | 2 | 60 | 62 | 65 |
| 44 | do | 1.5:1 | 3 | 2 | 62 | 65 | |
| 45 | do | 3.5:1 | 5.25 | 2 | 60 | 62 | 64 |
| 46 | do | 3.5:1 | 5.25 | 2 | 100 | 97½ | 95 |
| 47 | do | 3:1 | 4.5 | 2 | 60 | 62 | 64 |
| 48 | do | 3:1 | 4.5 | 2 | 45 | 48 | 52 |
| 49 | do | 3.5:1 | 5.25 | 2 | 110 | 100 | 90 |
| 50 | do | 3:1 | 4 | 2 | 94 | | |

When dehydrated crushed dice alone are used as the aggregtae, it has been found that rehydration will occur in the presence of the binder at temperatures between 45° and 130° F. Preferably, the rehydration should occur below 110° F. and more preferably between 45° and 90° F. A water to solids ratio of 1.5 to 3.5 to 1 has proven satisfactory. The following examples are illustrative.

EXAMPLE 51

100 grams of crushed, dehydrated, diced potatoes having a particle size distribution of:

| | Percent |
|---|---|
| Screen 10 mesh | 0 |
| Screen 16 mesh | 0 |
| Screen 20 mesh | 25.5 |
| Screen 40 mesh | 27.8 |
| Pan | 46.7 | were mixed with 4 gm. of dry Methocel 90 HG. To this mixture was added 200 ml. of water having a temperature of 110° F. The mixture was mixed at medium speed in a laboratory Hobart mixer for a period of 2 minutes.

After mixing, the mixture was extruded through a cookie press into oil having a temperature of 350° F. The mixture extruded smoothly and held together during frying. The fried product was very crisp, firm, and had a good potato flavor. Part of the fired product was frozen. Upon thawing at room temperature, the pieces remained firm. Upon refrying, they became very crisp.

EXAMPLE 52

Using the same dry mixture and procedure as in Example 51, water having a temperature of 130° F. was added. After mixing, the moist mixture was cooled to below 110° F. in a refrigerator before extruding. After frying, the product was very crisp and had a good potato flavor. Part of the product was placed in a deep freeze. It became soft in a few minutes and then froze. Part of the pieces were put in hot oil while still frozen. After refrying, the pieces were crisp. They remained crisp for several hours.

Another part of the pieces was allowed to thaw at room temperature before frying. They remained firm after thawing. After refrying, they had an acceptable texture.

EXAMPLE 53

Using the same dry mixture and procedure as in Example 51, water having a temperature of 80° F. was added. The moist mixture was mixed for three minutes and then extruded into oil having a temperature of 350° F. The extruded mixture was somewhat feathered. The fried product, when hot, was slightly crisp and had a good potato flavor. Upon standing, it became soft after a few minutes. Part of the product was frozen. Upon thawing it remained firm. After refrying, it was firm and had a good potato flavor.

EXAMPLE 54

Example 52 was repeated using 150 ml. of water instead of 200 ml. The product softened somewhat after Upon refrying, it remained firm. The product had a good potato flavor.

In any of the above examples the optional addition of raw vegetable pulp to the rehydrated mash was found to improve the flavor of the product. The amount of the raw pulp added may vary from about 0% to 1.5% of the weight of the vegetable solids. It is preferable that raw pulp in the amount of approximately 1% be used. It has also been found to be desirable to remove some of the natural juices of the vegetable, in order not to upset the most desirable water to solids ratio of the rehydrated mash. Accordingly, it is preferable that not more than 10% of the natural liquid which is mostly water be retained in pulp which is added to the rehydrated mash. Such pulp, when added to any of the above examples of the invention, has been found to enhance the flavor of the product.

Any of the starch vegetables may be used to substitute for the potato set out in the above examples. Also, it is possible to use any one of the cellulose ether binders, although hydroxypropyl methyl cellulose ether (Methocel 90 HG) and dimethylcellulos ether (Methocel MC) are most suitable. It is also possible to combine the various binders in any proportion.

From the foregoing detailed description it will be evident that there are a number of changes, adaptations, and modifications of the present invention which come within the province of those skilled in the art. However, it is intended that all such variations not departing from the spirit of the invention be considered as within the scope thereof as limited solely by the appended claims.

We claim:
1. A process for producing an edible product comprising:
   providing a dehydrated strach-containing vegetable in the form of aggregates, said aggregates containing at least a majority of their cells intact,
   adding water at a temperature between 45° and 130° F. for rehydrating said dehydrated vegetable,
   adding a thermal gelling cellulose ether binder to said vegetable to form a mixture,
   mixing said mixture for a sufficient time to rehydrate substantially all of said dehydrated vegetable in the presence of said binder and at a temperature between 45° and 130° F.,
   extruding said mixture at a temperature not over 110° F., and
   deep fat frying said mixture to form an edible product.

2. The process of claim 1 wherein the aggregates are selected from the group consisting of crushed dice and granules.

3. A process for producing an edible product comprising:
   providing a dehydrated starch-containing vegetable in the form of aggregates and particles of monocellular thickness, said aggregates containing at least a major portion of their cells intact, and being present in the amount of 5% up to 100% of the vegetable, adding water at a temperature between 45° and 110° F. for rehydrating said dehydrated vegetable, adding a thermal gelling cellulose ether binder to said vegetable to form a mixture, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

4. The process of claim 3 wherein the aggregates are present in the amount betwen 5% up to 100% by weight of the vegetable solids.

5. A process for producing an edible product comprising:

providing a dehydrated starch-containing vegetable in the form of aggregates containing a major portion of its form as intact cells, adding water at a temperature between 45° and 130° F. for rehydrating said dehydrated vegetable, said water being present in the amount of between approximately .9 to 4.5 parts by weight per part vegetable solid, adding a thermal gelling cellulose ether binder to said vegetable to form a mixture, mixing said mixture for a sufficient time to rehydrate substantially all of said dehydrated vegetable in the presence of said binder and at a temperature between 45° and 130° F., extruding said mixture at a temperature not over 110° F., and deep fat frying said mixture to form an edible product.

6. A process for producing an edible product comprising:

providing a dehydrated starch-containing vegetable in the form of aggregates containing a major portion of its form as intact cells, adding water at a temperature between 45° and 110° F. for rehydrating said dehydrated vegetable, adding a thermal gelling cellulose ether binder to said vegetable to form a mixture, said binder being added dry to the dehydrated vegetable and being wetted and solvated by said water, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

7. A process for producing an edible product comprising:

providing a dehydrated starch-containing vegetable in the form of aggregates containing a major portion of its form as intact cells, adding water at a temperature between 45° and 110° F. for rehydrating said dehydrated vegetable, adding a thermal gelling cellulose ether biner to said vegetable to form a mixture, said binder being added in solvation with said water, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

8. A process for producing an edible product comprising:

providing a dehydrated starch-containing vegetable in the form of aggregates containing a major portion of its form as intact cells, adding water at a temperature between 45° and 110° F. for rehydrating said dehydrated vegetable, adding a thermal gelling cellulose ether binder to said vegetable to form a mixture, said binder being present in the amount of between 1 to 30 parts by weight per 100 parts vegetable solids, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

9. A process for producing an edbile product comprising:

providing a dehydrated starch-containing vegetable in the form of aggregates and particles of monocellular thickness, said aggregates containing at least a major portion of their cells intact, and being present in the amount of 5% up to 100% of the vegetable, adding water at a temperature between 45° and 110° F. for rehydrating said dehydrated vegetable, adding a thermal gelling cellulose ether binder to said vegetable to form a mixture, said binder being added dry to the dehydrated vegetable and being wetted and solvated by said water, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

10. A process for producing an edible product comprising:

providing a dehydrated starch-containing vegetable in the form of aggregates and particles of monocellular thickness, said aggregates containing at least a major portion of their cells intact, and being present in the amount of 5% up to 100% of the vegetable, adding water at a temperature between 45° and 110° F. for rehydrating said dehydrated vegetable, adding a thermal gelling cellulose ether binder to said vegetable to form a mixture, said binder being added in solvation with said water, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

11. A process for producing an edible product comprising:

providing a dehydrated starch-containing vegetable in the form of aggregates containing a major portion of its form as intact cells and raw vegetable pulp in an amount up to approximately 1.5% by weight of vegetable solids, adding water at a temperature between 45° and 110° F. for rehydrating said dehydrated vegetable, adding a thermal gelling cellulose ether binder to said vegetable to form a mixture, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

12. A process for producing an edible product comprising:

providing a dehydrated starch-containing vegetable in the form of agregate and particles of monocellular thickness, said aggregates containing at least a major portion of their cells intact, and being present in the amount of 5% up to 100% of the vegetable, and raw vegetable pulp in an amount up to approximately 1.5% by weight of vegetable solids, adding water at a temperature between 45° and 110° F. for rehydrating said dehydrated vegetable, adding a thermal gelling cellulose ether binder to said vegetable to form a mixture, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

13. A process for producing an edible product comprising:

providing a dehydrated starch-containing vegetable in the form of aggregates containing a major portion of its form as intact cells, adding water at a temperature between 45° and 110° F. for rehydrating said dehydrated vegetable, adding a thermal gelling cellulose ether binder to said vegetable to form a mixture, mixing said mixture for a sufficient time to rehydrate substantially all of said dehydrated vegetable in the presence of said binder and at a temperature between 45° and 110° F., extruding said mixture at a temperature not over 110° F. and not below approximately 45° F., and deep fat frying said mixture to form an edible product.

14. A process for producing an edible product comprising:

providing a dehydrated starch-containing vegetable in the form of aggregates containing a major portion of its form as intact cells, and raw vegetable pulp in an amount up to approximately 1.5% by weight of vegetable solids, said raw pulp having up to 10% by weight of the natural juices removed, adding water at a temperature between 45° and 110° F. for rehydrating said dehydrated vegetable, adding a thermal gelling cellulose ether binder to said vegetable to form a mixture, mixing said mixture for a sufficient time to rehydrate substantially all of said dehydrated vegetable in the presence of said binder and at a temperature between 45° and 110° F., extruding said mixture at a temperature not over 110° F., and deep fat frying said mixture to form an edible product.

References Cited

UNITED STATES PATENTS

| | | | |
|---|---|---|---|
| 2,887,382 | 5/1959 | Rivoche | 99—1 |
| 3,085,020 | 4/1963 | Backinger et al. | 99—207 |
| 2,780,552 | 2/1957 | Willard et al. | 99—207 |

FOREIGN PATENTS 608,996  9/1948  Great Britain.

OTHER REFERENCES

Whistler: Industrial Gums, pp. 571, 577, 579 and 580, Academic Press, 1959.

Severson et al.: Quartermaster, Food and Container Institute for the Armed Forces, Chicago, Ill., pp. 223–227.

A. LOUIS MONACELL, *Primary Examiner.*

S. E. HEYMAN, *Assistant Examiner.*

UNITED STATES PATENT OFFICE
CERTIFICATE OF CORRECTION

Patent No. 3,399,062                      August 27, 1968

Miles J. Willard, Jr., et al.

It is certified that error appears in the above identified patent and that said Letters Patent are hereby corrected as shown below:

In the heading to the printed specification, lines 6 and 7, "Bonneville, Idaho" should read -- Idaho Falls, Idaho --.

Signed and sealed this 10th day of February 1970.

(SEAL)
Attest:

Edward M. Fletcher, Jr.

Attesting Officer

WILLIAM E. SCHUYLER, JR.

Commissioner of Patents